G. W. ROSS.
MOLDING MACHINE.
APPLICATION FILED SEPT. 20, 1909.

946,786.

Patented Jan. 18, 1910.
2 SHEETS—SHEET 1.

Witnesses:
Inventor:

G. W. ROSS.
MOLDING MACHINE.
APPLICATION FILED SEPT. 20, 1909.
946,786.
Patented Jan. 18, 1910.
2 SHEETS—SHEET 2.
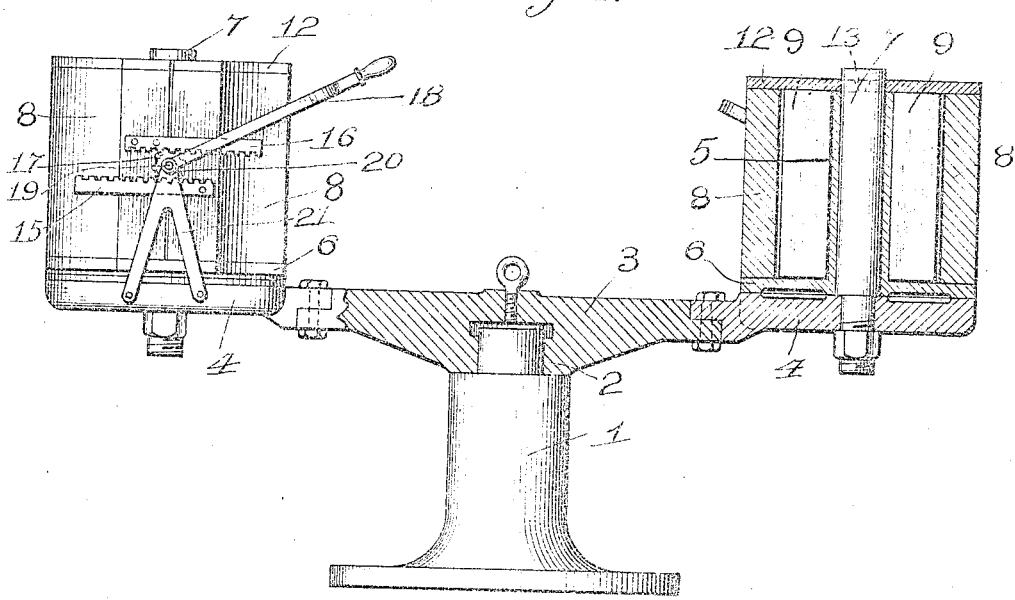
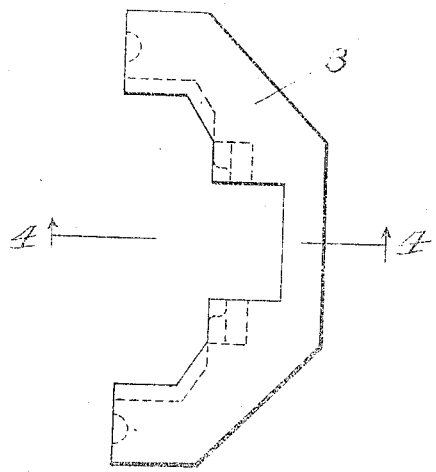
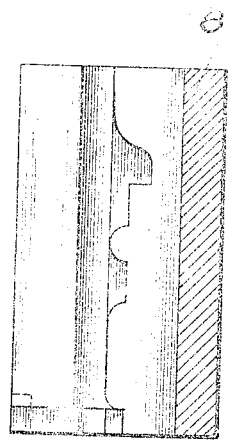
Witnesses:

UNITED STATES PATENT OFFICE.

GEORGE W. ROSS, OF CHICAGO, ILLINOIS, ASSIGNOR TO RAILWAY FOUNDRY COMPANY, OF CHICAGO, ILLINOIS, A CORPORATION OF ILLINOIS.

MOLDING-MACHINE.

946,780.

Specification of Letters Patent.   Patented Jan. 18, 1910.

Application filed September 20, 1909. Serial No. 518,624.

*To all whom it may concern:*

Be it known that I, GEORGE W. ROSS, a citizen of the United States of America, and a resident of Chicago, county of Cook, State of Illinois, have invented certain new and useful Improvements in Molding-Machines, of which the following is a specification.

Figure 1:
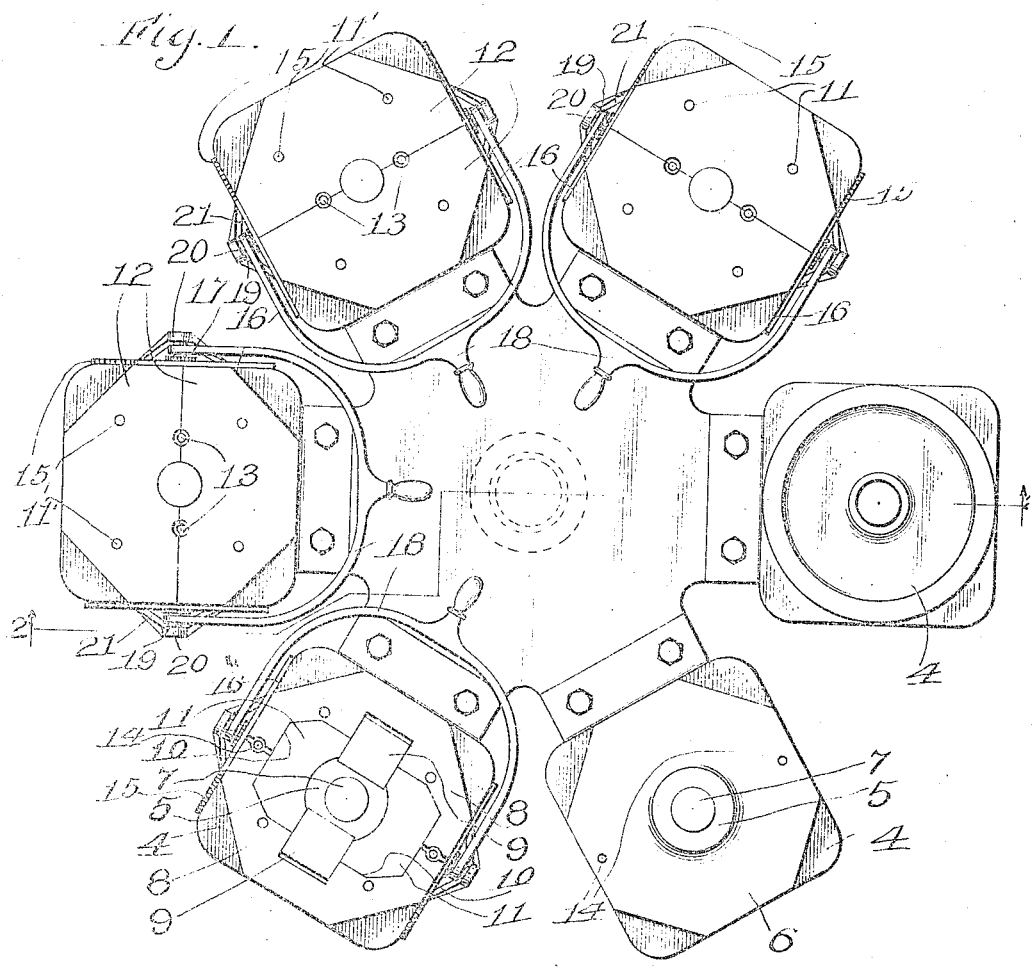
Figure 5:
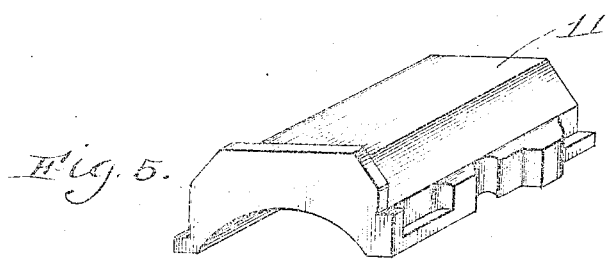

The main objects of this invention are to provide an improved form of mold for facilitating the operation of casting a large number of similar pieces and to provide an improved molding device of this character which is particularly adapted for molding railway journal-brasses. These objects are accomplished by the device shown in the accompanying drawings, in which:

Figure 1 is a top plan of a specific form of molding machine embodying this invention, some of the molds being indicated with some of the parts removed. Fig. 2 is a side elevation, partly sectional, of the same, but omitting the molds which are in the background. Fig. 3 is a top plan detail of one of the mold sections. Fig. 4 is a section of the same on the line 4—4 of Fig. 3. Fig. 5 is a perspective view of a railway journal-brass for the casting of which the molds shown in the drawings are designed.

In the form shown in the drawings, the machine comprises a base 1 in the form of a pedestal having an upright spindle 2 at the top, and a table 3 mounted to rotate on the spindle 2, and provided with a plurality of detachable bed plates 4 arranged in a circle having its center in the axis of the spindle 2. Mounted on each of the bed plates 4 is a core 5, which is provided with an integral bottom plate 6 and which is centered on the bed plate 4 by means of a spindle or bolt 7.

The molds comprise opposite matrices or mold sections 8, which fit together at their adjacent edges, and which are shaped at their middle parts to slidably fit guide pieces or walls in the form of feathers 9 mounted on the core 5. In the form shown, each core has a pair of guide feathers 9 secured thereto at opposite sides and the feathers are of uniform rectangular cross-section and extend vertically throughout the height of the mold cavity. The matrices are so shaped as to form molding cavities 10. In the form shown, the cavities 10 are shaped for casting railway journal-brasses, of the shape shown in Fig. 5. In Fig. 2, such brasses are shown in position in the mold. The bolt or spindle 7 extends above the top of the core 5 and serves to center the top plate 12 which closes the top of the mold. This plate is divided into two parts, each provided with a hole 13, through which holes metal may be poured into the cavities 10. The plates 12 and the corresponding mold sections 8 are detachably connected by dowel pins 11. As will be seen from Fig. 1, the mold sections 8 are movable toward and away from each other, the movement being guided by the feathers 9, and the movement toward each other being limited by stop pins 14, so as to properly center the mold sections 8 when the mold is closed.

One section of each mold is provided with a pair of racks 15, which are horizontally disposed and secured at opposite sides of said section. The other section is also provided with a pair of racks 16 which are opposed to the respective racks 15. A pinion 17 is interposed between the racks at each side of the mold and the pinions are rigidly connected to the respective arms of a forked lever or bail 18, each bail being provided with trunnions 19 which are journaled in bearings 20 carried by brackets 21, secured to the bed plate 4. The bails 18 are each provided with a handle by means of which they may be turned so as to cause the pinions 17 to rotate. The racks 15 and 16 are so disposed that the mold sections 8 will be drawn together when the bails extend toward the center of the machine, as in Fig. 2, and will be separated so as to permit the removal of the finished castings when the bails are swung so as to extend outward from the center of the table. The movement of the mold sections should of course be sufficient to shift them clear of any projecting parts on the castings.

In the form shown in the drawings, the core, mold sections, and top and bottom plates are preferably of metal such as steel, and have finished surfaces so that the brasses will be cast with smooth surfaces and will require little or no machining.

Although but one specific embodiment of this invention is herein shown and described, it will be understood that numerous details of the construction shown may be altered or omitted, within the scope of the following claims, without departing from the spirit of this invention.

I claim:—

1. In a device of the class described, the combination of a series of molds, means for moving said molds in succession along a certain path, each of said molds comprising a bottom plate, a core mounted on said bottom plate, a top plate, and a pair of mold sections slidably mounted on said bottom plate and arranged to inclose said core to provide one or more molding cavities between said mold sections and core, racks secured at opposite sides of each of said sections and the racks on one section being parallel with and opposed to those on the other, pinions interposed between said racks, and means for rotating said pinions for shifting said mold sections together or apart.

2. A mold, comprising a bottom plate, a core extending upward from said plate, a top plate, a pair of mold sections slidably mounted on said bottom plate and fitting together so as to inclose said core and form one or more mold spaces between said core and sections, racks secured to opposite sides of each of said mold sections and the racks on one section being opposed to those on the other, pinions interposed between said opposed racks, and a bail straddling said mold and rigidly connecting said pinions and adapted to rotate said pinions for shifting said mold sections toward or away from each other.

3. A mold, comprising a bottom plate, a core extending upward therefrom, mold sections slidably mounted on said bottom plate and fitting together so as to inclose said core to form one or more mold spaces between said core and sections, means on said core for guiding the movement of said sections, and mechanism for moving said sections toward and away from each other.

4. A mold, comprising a bottom plate, a core extending upward therefrom, a pair of mold sections slidably mounted on said bottom plate and fitting together so as to inclose said core to form one or more mold spaces between said core and sections, transverse guide tongues extending in opposite directions from said core and interfitting with said mold sections for guiding the same, a pair of racks on each of said mold sections disposed in parallel relation to the direction of the movement of said sections, the racks on one of said sections being opposed to those on the other, pinions interposed between the opposed racks, a bail straddling said mold sections, and rigidly connecting said pinions and adapted to rotate said pinions for shifting said sections toward and away from each other.

5. A mold, comprising a bottom plate, a core extending upward therefrom, a pair of mold sections slidably mounted on said bottom plate and fitting together so as to inclose said core to form one or more mold spaces between said core and sections, transverse guide tongues extending in opposite directions from said core and interfitting with said mold sections for guiding the same, a pair of racks on each of said mold sections disposed in parallel relation to the direction of the movement of said sections, the racks on one of said sections being opposed to those on the other, pinions interposed between the opposed racks, a bail straddling said mold sections, and rigidly connecting said pinions and adapted to rotate said pinions for shifting said sections toward and away from each other, trunnions on said bails in axial alinement with said pinions, and fixed bearings for said trunnions.

Signed at Chicago this 17th day of September 1909.

GEORGE W. ROSS.

Witnesses:
WILLIAM W. SMYTH,
PATRICK H. MOYNIHAN.